(12) United States Patent
Williams et al.

(10) Patent No.: US 10,883,455 B2
(45) Date of Patent: Jan. 5, 2021

(54) CURVED BASE AIR CLEANER

(71) Applicant: K&N Engineering, Inc., Riverside, CA (US)

(72) Inventors: Steve Williams, Beaumont, CA (US); Jere James Wall, Helendale, CA (US)

(73) Assignee: K&N Engineering, Inc., Riverside, CA (US)

( * ) Notice: Subject to any disclaimer, the term of this patent is extended or adjusted under 35 U.S.C. 154(b) by 179 days.

(21) Appl. No.: 15/337,356

(22) Filed: Oct. 28, 2016

(65) Prior Publication Data
US 2017/0122270 A1 May 4, 2017

Related U.S. Application Data

(60) Provisional application No. 62/247,642, filed on Oct. 28, 2015.

(51) Int. Cl.
| F02M 35/024 | (2006.01) |
| B01D 46/24 | (2006.01) |
| B01D 46/00 | (2006.01) |
| B01D 46/52 | (2006.01) |
| F02M 7/10 | (2006.01) |

(52) U.S. Cl.
CPC ... *F02M 35/02416* (2013.01); *B01D 46/0004* (2013.01); *B01D 46/0005* (2013.01); *B01D 46/2403* (2013.01); *B01D 46/521* (2013.01); *F02M 7/10* (2013.01); *B01D 2265/029* (2013.01); *B01D 2275/208* (2013.01); *B01D 2279/60* (2013.01)

(58) Field of Classification Search
CPC .......... F02M 35/024; F02M 35/02416; F02M 35/02483; B01D 2279/60; B01D 46/0002; B01D 46/0004; B01D 46/0005; B01D 46/2403; B01D 46/2411; B01D 46/24
See application file for complete search history.

(56) References Cited

U.S. PATENT DOCUMENTS

| 2,988,170 | A | * | 6/1961 | Pritchard | ............... F02M 35/14 |
| | | | | | 181/229 |
| 2,996,145 | A | * | 8/1961 | Thornburgh | ....... B01D 46/2411 |
| | | | | | 264/DIG. 48 |
| 3,235,633 | A | * | 2/1966 | Holloway | .......... B01D 46/2414 |
| | | | | | 264/257 |
| 3,355,863 | A | * | 12/1967 | Pittsley | .................. F02M 35/14 |
| | | | | | 210/320 |

(Continued)

*Primary Examiner* — Robert Clemente
(74) *Attorney, Agent, or Firm* — Rutan & Tucker LLP; Hani Z. Sayed

(57) ABSTRACT

An apparatus and methods are provided for an air cleaner to be mounted onto an air inlet of an internal combustion engine. The air cleaner comprises an air filter that includes a filter medium disposed between a curved base and a cover. The curved base provides an interface between the air filter and the air inlet, and comprises a shape that provides clearance between the curved base and an electric choke installed onto a carburetor comprising the air inlet. The cover secures the air filter and the curved base to the air inlet such that an airstream is drawn through the filter medium and is conducted into the air inlet. A raised portion of the cover is configured to cooperate with the curved base to ensure a desired volume of the airstream is available to the air inlet at substantially all engine speeds.

18 Claims, 2 Drawing Sheets

(56) References Cited

U.S. PATENT DOCUMENTS

| | | | |
|---|---|---|---|
| 3,413,780 A * | 12/1968 | Amlott | F02M 35/14 |
| | | | 55/419 |
| 3,563,009 A * | 2/1971 | Wheatley et al. | F02M 35/024 |
| | | | 55/510 |
| 3,563,010 A | 2/1971 | Wheatley | |
| 5,447,546 A * | 9/1995 | Thibodeau | B01D 46/24 |
| | | | 261/23.2 |
| 8,608,135 B2 | 12/2013 | Schultz et al. | |
| 2002/0020157 A1 | 2/2002 | Hirano et al. | |
| 2003/0163980 A1 | 9/2003 | Ruehle | |
| 2014/0165949 A1 | 6/2014 | Sroka et al. | |

* cited by examiner

CURVED BASE AIR CLEANER

PRIORITY

This application claims the benefit of and priority to U.S. Provisional Application, entitled "Curved Base Air Cleaner," filed on Oct. 28, 2015 and having application Ser. No. 62/247,642.

FIELD

The field of the present disclosure generally relates to air filter devices. More particularly, the field of the present disclosure relates to an apparatus and a method for a curved base air cleaner which facilitates installing readily available, standard-sized air filters onto a majority of performance carburetor systems having limited hood clearance so as to provide an optimal air flow at substantially all engine speeds.

BACKGROUND

An air filter designed to remove particulate matter from an airstream generally is a device comprising fibrous materials. These fibrous materials may remove solid particulates such as dust, pollen, mold, and bacteria from the airstream. Air filters are used in applications where air quality is important, notably in building ventilation systems and with engines.

Air filters may be used in automobiles, trucks, tractors, locomotives and other vehicles that use internal combustion engines. Air filters may be used with gasoline engines, diesel engines, or other engines that utilize fossil fuels or other combustible substances. Air filters may be used with engines in which combustion is intermittent, such as four-stroke and two-stroke piston engines, as well as other types of engines that take in air continuously such that a combustible substance may be burned. For example, air filters may be used with some gas turbines. Filters may also be used with air compressors and in other devices that relay on intake air.

Filters may be made from pleated paper, foam, cotton, spun fiberglass, or other known filter materials. Generally, air filters used with internal combustion engines and compressors are comprised of either paper, foam, or cotton filter materials. Some filters use an oil bath wherein particulate matter and contaminants are trapped in the oil. Air filters for internal combustion engines prevent abrasive particulate matter from entering the engine's cylinders, where the particulate matter would cause mechanical wear and oil contamination. In many fuel injected engines, a flat panel pleated paper filter element may be used. A flat panel filter is usually placed inside a plastic box connected to a throttle body of the engine by way of ductwork. Vehicles that use carburetors or throttle body fuel injection typically use a cylindrical air filter positioned above the carburetor or throttle body.

It will be recognized that in many performance automotive applications, it is desirable to install a low profile, such as a drop base air cleaner 104, onto a performance carburetor system 108, as shown in FIG. 1. As shown in FIG. 2, a drawback to conventional drop base air cleaners is that often times a base plate 112 of the air cleaner 104 interferes with an electric choke 116, or other electric components, of the carburetor 108. In many automotive applications, there is insufficient clearance between the base plate 112 and the electric choke 116, thus preventing installation of the base plate 112 onto the carburetor 108. Once solution is simply to install a flat base air cleaner in lieu of the drop base air cleaner 104, as shown in FIG. 2. In many performance applications, however, there is limited clearance between the top of the carburetor 108 and the underside of the hood of the vehicle. It will be appreciated that the flat base air cleaner generally raises the filter above the carburetor 108, which places the air cleaner close enough to the underside of the hood so as to interfere with air flow at higher engine speeds. Further, raising the air cleaner above the carburetor 108 may cause contact between the air cleaner and the underside of the hood, potentially damaging the air cleaner during engine operation. Moreover, in some applications the flat base air cleaner may be tall enough to prevent closing the hood of the vehicle.

Another solution to prevent interference between the base plate 112 and the electric choke 116 is to install the drop base air cleaner 104 with a spacer ring 120 disposed between an air inlet 124 of the carburetor 108 and the base plate 112. As shown in FIG. 1, the spacer ring 120 effectively raises the air cleaner 104 above the carburetor 108 so as to eliminate the interference between the electric choke 116 and the base plate 112. As with using the flat base air cleaner, however, using the spacer ring 120 is prohibited in many performance applications wherein hood clearance is limited or insufficient. In some applications, the spacer ring 120 gives the air cleaner 104 a height 128 above the carburetor 108 which exceeds the hood clearance, and thus prevents the hood from being closed or leads to damaging contact between the air cleaner and the hood during operation of the engine.

What is needed, therefore, is a drop base air cleaner which facilitates installing readily available, standard-sized air filters onto a majority of performance carburetor systems, having limited hood clearance, so as to provide an optimal air flow at substantially all engine speeds.

SUMMARY

An apparatus and a method are provided for an air cleaner configured to be mounted onto an air inlet of an internal combustion engine. The air cleaner comprises an air filter disposed between a curved base and a cover. The air filter is configured to remove particulate matter and other contaminates from an incoming airstream. The curved base provides an interface between the air filter and the air inlet, and provides clearance between the air cleaner and an electric choke installed onto the air inlet. The cover secures the air filter and the curved base to the air inlet such that air is drawn through the air filter and conducted into the air inlet. A raised portion of the cover provides clearance between the cover and the curved portion so as to ensure a sufficient volume of air flow to the air inlet at all engine speeds.

In an exemplary embodiment, an air cleaner to be mounted onto an air inlet of an internal combustion engine comprises: an air filter comprising a filter medium disposed between a first end cap and a second end cap; a curved base configured to provide an interface between the air filter and the air inlet; and a cover configured to secure the air filter and the curved base to the air inlet such that an airstream is drawn through the filter medium and is conducted into the air inlet.

In another exemplary embodiment, the curved base comprises a curved portion that extends radially from an inlet receiver configured to receive the air inlet to a peripheral flat portion that is configured to couple with the first end cap. In another exemplary embodiment, the curved portion comprises a compound-curve cross-sectional shape that provides clearance between the curved base and an electric choke installed onto a carburetor comprising the air inlet. In another exemplary embodiment, the compound-curve cross-sectional shape comprises a series of tangent curves, one or more of the tangent curves each comprising a unique radius of curvature. In another exemplary embodiment, the compound-curve cross-sectional shape comprises at least a first radius of curvature adjacent to the inlet receiver, a second radius of curvature along the curved portion extending away from the inlet receiver, and a third radius of curvature adjacent to the peripheral flat portion. In another exemplary embodiment, the second radius of curvature is greater than the first radius of curvature and the third radius of curvature, and the third radius of curvature is greater than the first radius of curvature. In another exemplary embodiment, the peripheral flat portion comprises a horizontal surface that circumferentially surrounds the curved portion and is configured to directly contact an entirety of the first end cap so as to ensure that the airstream is drawn through the filter medium.

In another exemplary embodiment, the cover comprises a peripheral flat portion that is configured to couple with the second end cap and circumferentially surrounds a raised portion that is configured to provide a predetermined degree of clearance between the cover and the curved portion. In another exemplary embodiment, the peripheral flat portion comprises a horizontal surface that is configured to directly contact an entirety of the second end cap so as to ensure that the airstream is drawn through the filter medium. In another exemplary embodiment, the predetermined degree of clearance is configured to ensure a desired volume of the airstream is directed to the air inlet at substantially all engine speeds.

In another exemplary embodiment, the curved base comprises a first peripheral edge configured to retain the first end cap, and the cover comprises a second peripheral edge configured to retain the second end cap, the first and second peripheral edges being configured to retain the air filter between the curved base and the cover. In another exemplary embodiment, a fastener is configured to retain the cover, the air filter, and the curved base fixedly installed onto the air inlet. In another exemplary embodiment, the fastener comprises a thumb nut that may be hand-tightened onto a threaded stud extending from the air inlet through a hole disposed within a depression in the center of the cover.

In an exemplary embodiment, a method for an air cleaner to be mounted onto an air inlet of an internal combustion engine comprises: providing an air filter comprising a filter medium disposed between a first end cap and a second end cap; configuring a curved base comprising an interface between the air filter and the air inlet; and forming a cover to secure the air filter and the curved base to the air inlet such that an airstream is drawn through the filter medium and into the air inlet.

In another exemplary embodiment, configuring the curved base comprises extending a curved portion radially away from an inlet receiver to a peripheral flat portion that is configured to receive the first end cap, the inlet receiver configured to be coupled with the air inlet. In another exemplary embodiment, configuring the curved base further comprises forming a compound-curved cross-sectional shape of the curved base to provide clearance between the curved base and an electric choke of a carburetor comprising the air inlet, the compound-curved cross-sectional shape comprising at least a first radius near the inlet receiver, a second radius extending away from the inlet receiver, and a third radius adjacent to the peripheral flat portion. In another exemplary embodiment, configuring the curved base further comprises selecting the first radius, the second radius, and the third radius, such that the second radius is greater than the first radius and the third radius, and the third radius is greater than the first radius.

In another exemplary embodiment, forming the cover comprises forming a peripheral flat portion to couple with the second end cap and circumferentially surround a raised portion that provides a predetermined degree of clearance between the cover and the curved portion. In another exemplary embodiment, forming the cover further comprises configuring the predetermined degree of clearance to ensure a desired volume of the airstream is directed to the air inlet at substantially all engine speeds.

BRIEF DESCRIPTION OF THE DRAWINGS

The drawings refer to embodiments of the present disclosure in which.

Figure 1:
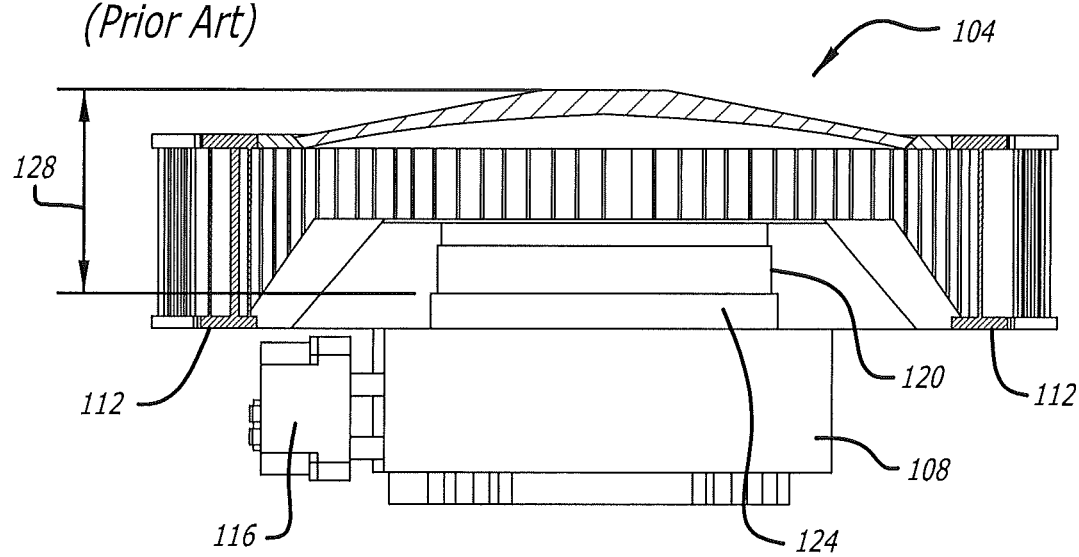
FIG. 1 is a side cutaway view illustrating an exemplary drop base air cleaner installed onto a performance carburetor by way of a spacer ring.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first filter," may be made. However, the specific numeric reference should not be interpreted as a literal sequential order but rather interpreted that the "first filter" is different than a "second filter." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Although embodiments of the present disclosure may be described and illustrated herein in terms of an oval air filter, it should be understood that embodiments of the present disclosure are not limited to the exact shape illustrated, but rather may include a wide variety of generally cylindrical shapes, generally circular, round, curved, conical, or other closed perimeter shapes, that provide a relatively large surface area in a given volume of the air cleaner.

In general, the present disclosure describes an apparatus and a method for an air cleaner configured to be mounted onto an air inlet of an internal combustion engine. In some embodiments, the air inlet comprises an air inlet of a performance carburetor, such as the carburetor 108. The air cleaner comprises an air filter disposed between a curved base and a cover. The air filter comprises a filter medium configured to remove particulate matter and other contaminates from an incoming airstream. The curved base is configured to provide an interface between the air filter and the air inlet, and provides clearance between the curved base and an electric choke installed onto the air inlet. The cover is configured to secure the air filter and the curved base to the air inlet such that air is drawn through the air filter and conducted into the air inlet. A raised portion of the cover is configured to provide a predetermined degree of clearance between the cover and the curved portion so as to ensure a sufficient volume of air flow to the air inlet at substantially all engine speeds.

Figure 2:
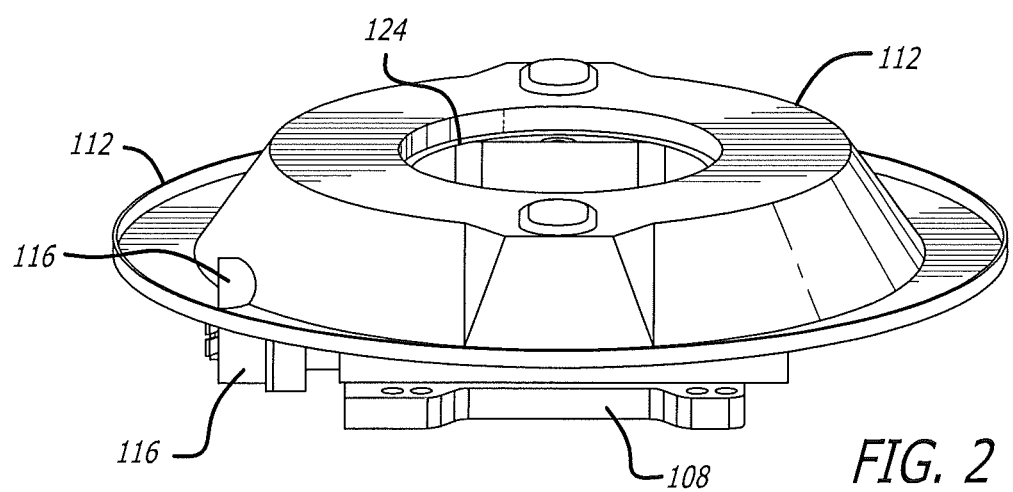
FIG. 2 is an upper perspective view illustrating interference between an exemplary electric choke of a performance carburetor and a base plate of an exemplary drop base air cleaner.
Figure 3:
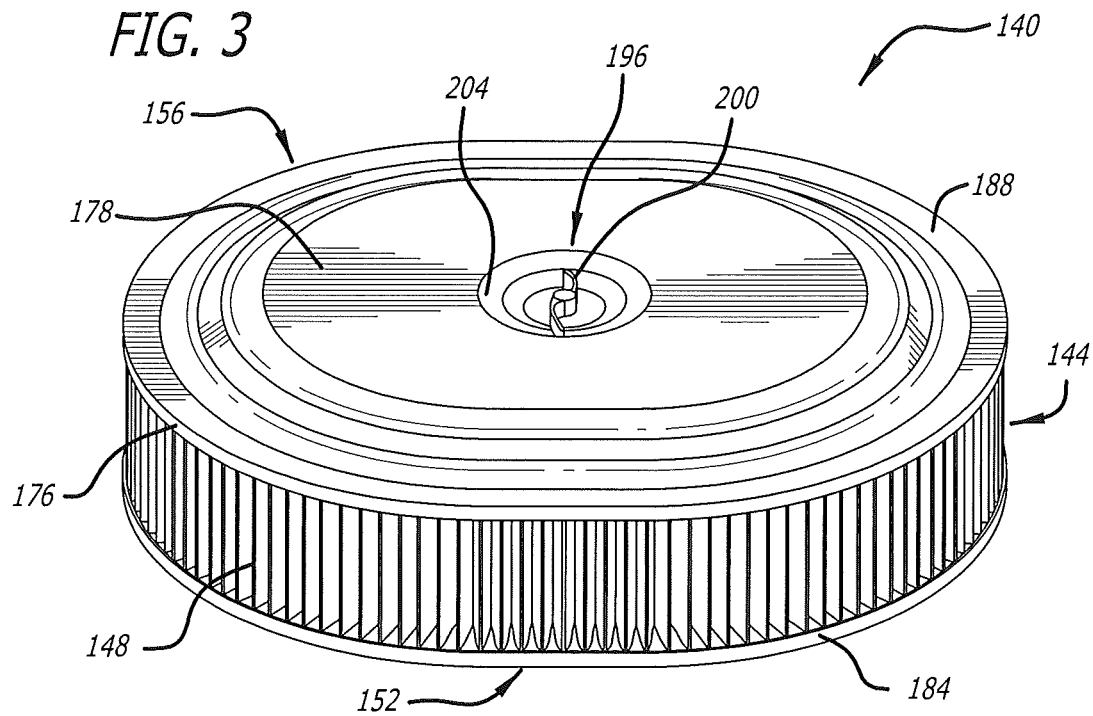
FIG. 3 is an upper perspective view illustrating an exemplary embodiment of a curved base air cleaner in accordance with the present disclosure.

FIG. 3 illustrates an exemplary embodiment of a curved base air cleaner 140 comprising an air filter 144, according to the present disclosure. The curved base air cleaner 140 is configured to be mounted onto an air inlet of an internal combustion engine. In some embodiments, the air inlet may be the air inlet 124 of the performance carburetor 108, discussed in connection with FIGS. 1 and 2. The air inlet is not to be limited to the performance carburetor 108, however, but rather may be any air intake whereby an airstream is drawn into an internal combustion engine and mixed with liquid fuel for combustion, such as by way of non-limiting example, an air intake of a throttle body, turbocharger, supercharger, direct port fuel injection, as well as some gas turbines, and the like. Further, the air filter 144 should be understood to comprise any of various standard-sized, readily available air filters suitable for use with an internal combustion engine. It should be understood, therefore, that the curved base air cleaner 140 may be adapted for use with a wide variety of different air filter applications without deviating beyond the spirit and scope of the present disclosure.

Figure 4:
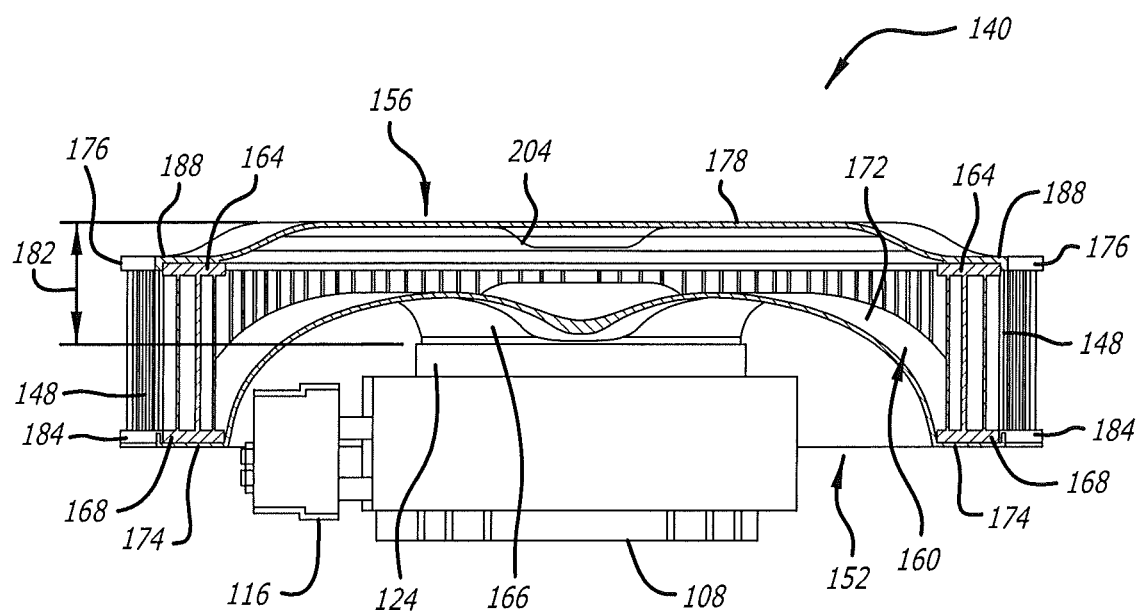
FIG. 4 is a side cutaway view illustrating an exemplary embodiment of a curved base air cleaner installed onto a performance carburetor system, according to the present disclosure.

In the embodiment illustrated in FIG. 3, the air filter 144 comprises a filter medium 148 retained between a curved base 152 and a cover 156. The curved base 152 and cover 156 preferably are comprised of materials that are sufficiently durable and temperature resistant so as to retain their configuration during installation and operation when coupled with the air inlet 124 of the carburetor 108. As best illustrated in FIG. 4, the filter medium 148 circumferentially surrounds an interior cavity 160 such that the filter medium 148 creates an exterior perimeter of at least a portion of the cavity. An exterior cross-sectional shape of the air filter 144 may be generally circular, oval, or otherwise shaped so as to increase the surface area available for air flow passage for a given volume. The shape may be consistent along a longitudinal length, or may vary along the longitudinal length. In some exemplary embodiments, the outer profile may taper along the longitudinal length, from one end to the other end.

The filter medium 148 provides an area to pass an airstream and entrap particulates and other contaminates flowing with the airstream. The filter medium 148 may be comprised of paper, foam, cotton, spun fiberglass, or other known filter materials, woven or non-woven material, synthetic or natural, or any combination thereof. The filter medium 148 may be pleated, or otherwise shaped, or contoured so as to increase the surface area for passing the airstream to be cleaned. Thus, the length of the filter medium 148 in the circumferential direction may be longer than the oval circumference of the air filter 144 generally, such that the surface area of the filter medium 148 is greater than the profile surface area of the air filter 144.

FIG. 4 is a side cutaway view illustrating the air filter 144 installed onto the air inlet 124 of the carburetor 108 by way of the curved based 152 and the cover 156. The curved base 152 generally is configured to support the air filter 144 and provide an interface between the air filter 144 and the air inlet 124 of the carburetor 108. The curved base 152 comprises an inlet receiver 166 which is configured to receive the air inlet 124. The cover 156 is configured to secure the air filter 144 and the curved base 152 to the air inlet 124, such that air is drawn through the filter medium 148 into the interior cavity 160 and then is conducted through the inlet receiver 166 into the air inlet 124 of the carburetor 108. As mentioned, the inlet receiver 166 of the curved base 152 has a configuration suitable to accept the air inlet 124. For example, the inlet receiver 166 may comprise any of a variety of ridges, or raised portions so as to optimally engage the air inlet 124. Further, it is envisioned that the inlet receiver 166 may be tightened onto the air inlet 124 by way of any of various suitable mechanical fasteners. It should be understood that the specific configuration of the inlet receiver 166 depends upon the particular make and model of the engine for which the air filter 144 is to be utilized, and thus a wide variety of configurations may be incorporated into the air filter 144, the curved base 152, and the inlet receiver 166 without straying beyond the scope of the present disclosure.

The curved base 152 comprises a curved portion 172 extending radially from the inlet receiver 166 to a peripheral flat portion 174. As will be appreciated, the curved portion 172 comprises a compound-curve cross-sectional shape which is configured to provide clearance between the curved base 152 and the electric choke 116, as well as other components installed onto the carburetor 108. In some embodiments, the compound-curve cross-sectional shape comprises a series of tangent curves, each of which tangent curves comprising a unique radius of curvature. For example, in an exemplary embodiment the curved portion 172 comprises a relatively small radius of curvature adjacent to the inlet receiver 166, followed by a relatively large radius along the curved portion 172 extending radially away from the inlet receiver 166, and an intermediate radius of curvature approaching to the peripheral flat portion 174. It will be appreciated that any number of unique tangent curves may be incorporated into the compound-curve cross-sectional shape of the curved portion 172, such that clearance is provided between the curved base 152 and the electric choke 116, as shown in FIG. 4.

The peripheral flat portion 174 comprises a horizontal surface of the curved base 152 which circumferentially surrounds the curved portion 172 and is configured to support an end cap 168 of the air filter 144. The peripheral flat portion 174 preferably has a width which closely matches a thickness of the air filter 144, such that an entirety of the end cap 168 directly contacts the peripheral flat portion 174, and the curved portion 172 contacts an interior circumference of the end cap 168. The direct contact between the end cap 168 and the peripheral flat portion 174 operates to prevent incoming air from bypassing the air filter 144 and flowing around the end cap 168, and thus ensures that the incoming air is drawn through the filter medium 148.

The cover 156 comprises a peripheral flat portion 188 which is similar to the peripheral flat portion 174. As best illustrated in FIG. 3, the peripheral flat portion 188 comprises a horizontal surface of the cover 156 which circumferentially surrounds a raised portion 178 of the cover 156. As shown in FIG. 4, the peripheral flat portion 188 of the cover 156 has a width which substantially matches the thickness of the air filter 144 so as to place substantially an entirety of an end cap 164 of the air filter 144 in direct contact with the peripheral flat portion 188. Similar to the direct contact between the end cap 168 and the peripheral flat portion 174, the direct contact between the end cap 164 and the peripheral flat portion 188 ensures that incoming air is drawn through the filter medium 148 instead of passing between the end cap 164 and the cover 156.

The raised portion 178 is configured to provide a predetermined degree of clearance between the cover 156 and the curved portion 172 of the curved base 152, thereby ensuring a sufficient volume of air flow at substantially all engine speeds. It should be appreciated, therefore, that when the air filter 144 is positioned between the peripheral flat portions 174, 188, the curved base 152 and the cover 156 cooperate to direct the airstream through the air filter 144 into the interior cavity 160. The curved and raised portions 172, 178 cooperate to direct the airstream through the interior cavity 160 to the inlet receiver 166 whereby the airstream is drawn into the carburetor 108. Further, upon comparing the curved base air cleaner 140, illustrated in FIG. 3, with the conventional drop base air cleaner 104, illustrated in FIG. 2, it will be recognized that the curved base 152 and the cover 156 cooperate to give the curved base air cleaner 140 a height 182 which is substantially less than the height 128 of the drop base air cleaner 104 while also providing clearance between the curved base 152 and the electric choke 116. It will be appreciated, therefore, that the curved base air cleaner 140 of the present disclosure facilitates installing the air filter 144 onto a majority of performance carburetor systems wherein limited hood clearance would otherwise render installing a conventional drop base air cleaner impossible.

As described above, the air filter 144 comprises the filter medium 148 retained between the end caps 164 and 168. The end caps 164, 168 may be either rubber or plastic or other deformable material sufficiently strong to support the filter medium 148. For example, one or both of the end caps 164, 168 may be molded urethane, foam urethane, or a polyurethane elastomer, and/or may comprise a steel, or aluminum infrastructure. In the exemplary embodiment shown, an elastomer molded polyurethane is used to provide an additional hardness and robust exterior seat for the filter medium 148. For reusable filters, the molded elastomer is preferable over foam so as to reduce degradation during cleaning of the air filter.

In some embodiments, a wire support may be incorporated into the filter medium 148 so as to provide additional strength and durability to the air filter 144. As such, the wire support preferably is retained by the end caps 164 and 168 along with the filter medium 148. It will be appreciated that the filter medium 148 and the wire support may be affixed to the end caps 144, 168 by way of any of a variety of fasteners (not shown). In some embodiments, the end caps 164, 168 may be molded to the wire support of the filter medium 148. In some embodiments, a portion of each of the end caps 164, 168 may be crimped around its peripheral edge such that it folds onto and retains the wire support and the filter medium 148 of the air filter 144. Any of a variety of fastening means may be practiced for attaching the filter medium 148 and the wire support to the end caps 164, 168 without deviating from the spirit and scope of the present disclosure.

With reference again to FIGS. 3 and 4, the cover 156 comprises a peripheral edge 176 configured to retain the end cap 164 of the air filter 144. Similarly, the curved base 152 comprises a peripheral edge 184 configured to retain the end cap 168 of the air filter 144. It will be appreciated that the peripheral edges 176, 184 serve to retain the air filter 144 in a centered position between the cover 156 and the curved base 152, such that the airstream is drawn through the filter medium 148 when the filter 144 is installed onto the air inlet 124 of the carburetor 108. A fastener 196 serves to keep the air filter 144 fixed between the cover 156 and the curved base 152, and thus installed onto the air inlet 124 of the carburetor 108. In the illustrated embodiment, the fastener 196 is simply a thumb nut 200 positioned within a depression 204 disposed in the center of the cover 156. A hole in the center of the depression 204 allows passage of a threaded stud (not shown) extending upward from the air inlet 124 through the interior cavity 160 of the air filter 144. As indicated in FIG. 3, the thumb nut 204 preferably is hand-tightened onto the threaded stud so as to install the cover 156, the air filter 144, and the curved base 152 onto the air inlet 124 of the carburetor 108.

It is envisioned that a user of the air filter 144 may periodically clean the filter medium 148 rather than replacing the air filter 144, as is typically done with conventional air filters. In some embodiments, a method for cleaning the filter medium 148 comprises removing the cover 156 from the curved base air cleaner 140, removing the air filter 144 from the curved base 152, inserting a water hose into the interior cavity 160 of the filter, and spraying water so as to flush contaminants from the filter medium 148. In some embodiments, the method for cleaning the air filter 144 comprises utilizing a high pressure air hose in lieu of the water hose. In some embodiments, the method for cleaning the air filter 144 comprises spraying water onto the exterior of the filter medium 148, such that the water and contaminants drain from the exterior of the filter medium 148. Other cleaning methods will be apparent to those skilled in the art without deviating from the spirit and scope of the present disclosure.

As discussed above, a wire support may be coupled with the filter medium 148 so as to provide additional strength and durability to the air filter 144. The wire support facilitates periodic cleaning and reusing the air filter 144 instead of discarding the filter after each application. In some embodiments, the filter medium 148 may be positioned between the wire support and one or more layers of a reinforcing material. For example, the wire support may comprise a wire screen positioned on an outer surface and an inner surface of the filter medium 148. In some embodiments, the wire screens may be comprised of powder-coated aluminum screen wire that is co-pleated along with the filter medium 148 so as to reinforce the air filter 144. In some embodiments, the inner surface of the filter medium 148 may comprise a stronger mesh reinforcement which is similar to those incorporated into Diesel filter applications. In some embodiments, additional or alternative reinforcements may be provided, as will be apparent to those skilled in the art.

In the embodiment of the air filter 144 illustrated in FIGS. 3 and 4, the curved base 152 has a size and shape substantially equal to the size and shape of the cover 156. In some embodiments, however, the curved base 152 may have a larger size than the size of the cover 156. It should be understood that the air filter 144 of the present disclosure is not limited to the exact shape illustrated in FIGS. 3 and 4, but rather may include a wide variety of generally cylindrical shapes, generally circular, round, curved, or other closed perimeter shapes, that provide a relatively large surface area of the filter medium 148. In some embodiments, the filter medium 148 may comprise various heights other than as shown in FIGS. 3 and 4, so as to accommodate hood clearances in various makes and models of vehicles.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An air cleaner to be mounted onto an air inlet of an internal combustion engine, comprising:
   an air filter comprising a filter medium disposed between a first end cap and a second end cap;
   a curved base configured to provide an interface between the air filter and the air inlet, wherein the curved base comprises an air inlet receiver, wherein the air inlet receiver is a curved portion configured to direct an airstream toward the air inlet; and
   a cover configured to secure the air filter and the curved base to the air inlet such that an airstream is drawn through the filter medium and is conducted into the air inlet,
   wherein the curved base extends radially outward from a center axis of the curved base in a first direction at least a base radius, wherein the base radius is at least two times larger than a height of the air cleaner above the air inlet, and wherein the curved based is configured to form an interior cavity that provides clearance between the curved base and an electric choke installed on a carburetor comprising the air inlet, wherein the curved portion of the inlet receiver faces both an interior of the air cleaner and the interior cavity.

2. The air cleaner of claim 1, wherein the curved base comprises a curved portion that extends radially from the inlet receiver configured to receive the air inlet to a peripheral flat portion that is configured to couple with the first end cap.

3. The air cleaner of claim 2, wherein the compound-curve cross-sectional shape comprises a series of tangent curves, one or more of the tangent curves each comprising a unique radius of curvature.

4. The air cleaner of claim 3, wherein the compound-curve cross-sectional shape comprises at least a first radius of curvature adjacent to the inlet receiver, a second radius of curvature along the curved portion extending away from the inlet receiver, and a third radius of curvature adjacent to the peripheral flat portion.

5. The air cleaner of claim 4, wherein the second radius of curvature is greater than the first radius of curvature and the third radius of curvature, and the third radius of curvature is greater than the first radius of curvature.

6. The air cleaner of claim 2, wherein the peripheral flat portion comprises a horizontal surface that circumferentially surrounds the curved portion and is configured to directly contact an entirety of the first end cap so as to ensure that the airstream is drawn through the filter medium.

7. The air cleaner of claim 1, wherein the cover comprises a peripheral flat portion that is configured to couple with the second end cap and circumferentially surrounds a raised portion that is configured to provide a predetermined degree of clearance between the cover and the curved portion.

8. The air cleaner of claim 7, wherein the peripheral flat portion comprises a horizontal surface that is configured to directly contact an entirety of the second end cap so as to ensure that the airstream is drawn through the filter medium.

9. The air cleaner of claim 7, wherein the predetermined degree of clearance is configured to ensure a desired volume of the airstream is directed to the air inlet at substantially all engine speeds.

10. The air cleaner of claim 1, wherein the curved base comprises a first peripheral edge configured to retain the first end cap, and the cover comprises a second peripheral edge configured to retain the second end cap, the first and second peripheral edges being configured to retain the air filter between the curved base and the cover.

11. The air cleaner of claim 1, wherein a fastener is configured to retain the cover, the air filter, and the curved base fixedly installed onto the air inlet.

12. The air cleaner of claim 11, wherein the fastener comprises a thumb nut that may be hand-tightened onto a threaded stud extending from the air inlet through a hole disposed within a depression in the center of the cover.

13. A method for an air cleaner to be mounted onto an air inlet of an internal combustion engine, comprising:
    providing an air filter comprising a filter medium disposed between a first end cap and a second end cap;
    configuring a curved base to retain the first end cap and the second end cap, the curved base comprising an interface between the air filter and the air inlet, wherein the interface includes an air inlet receiver being a curved portion configured to direct an airstream toward the air inlet; and
    forming a cover to secure the air filter and the curved base to the air inlet such that an airstream is drawn through the filter medium and into the air inlet,
    wherein the curved base extends radially outward from a center axis of the curved base in a first direction at least a base radius, wherein the base radius is at least two times larger than a height of the air cleaner above the air inlet, and wherein the curved based is configured to form an interior cavity that provides clearance between the curved base and an electric choke installed on a carburetor comprising the air inlet, wherein the curved portion of the inlet receiver faces both an interior of the air cleaner and the interior cavity.

14. The method of claim 13, wherein configuring the curved base comprises extending a curved portion radially away from the inlet receiver to a peripheral flat portion that is configured to receive the first end cap, the inlet receiver configured to be coupled with the air inlet.

15. The method of claim 14, wherein the compound-curved cross-sectional shape is further configured to comprise at least a first radius near the inlet receiver, a second radius extending away from the inlet receiver, and a third radius adjacent to the peripheral flat portion.

16. The method of claim 15, wherein configuring the curved base further comprises selecting the first radius, the second radius, and the third radius, such that the second radius is greater than the first radius and the third radius, and the third radius is greater than the first radius.

17. The method of claim 13, wherein forming the cover comprises forming a peripheral flat portion to couple with the second end cap and circumferentially surround a raised portion that provides a predetermined degree of clearance between the cover and the curved portion.

18. The method of claim 17, wherein forming the cover further comprises configuring the predetermined degree of clearance to ensure a desired volume of the airstream is directed to the air inlet at substantially all engine speeds.

* * * * *